(12) United States Patent
Holmes et al.

(10) Patent No.: US 10,906,629 B2
(45) Date of Patent: Feb. 2, 2021

(54) LEADING EDGE SKIN STRUCTURE

(71) Applicant: Airbus Operations Limited, Bristol (GB)

(72) Inventors: Vernon John Holmes, Bristol (GB); Rodney Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 303 days.

(21) Appl. No.: 16/016,876

(22) Filed: Jun. 25, 2018

(65) Prior Publication Data

US 2019/0002081 A1 Jan. 3, 2019

(30) Foreign Application Priority Data

Jun. 29, 2017 (GB) .................................. 1710383.9

(51) Int. Cl.
*B64C 3/28* (2006.01)
*B64C 3/26* (2006.01)
*B64C 3/14* (2006.01)

(52) U.S. Cl.
CPC ................. *B64C 3/28* (2013.01); *B64C 3/14* (2013.01); *B64C 3/26* (2013.01); *B64C 2003/146* (2013.01)

(58) Field of Classification Search
CPC .... B64C 3/28; B64C 3/14; B64C 3/26; B64C 2003/146
See application file for complete search history.

(56) References Cited

U.S. PATENT DOCUMENTS

| | | | | |
|---|---|---|---|---|
| 8,602,355 B2 * | 12/2013 | McBroom | ................. | B64C 3/28 244/123.1 |
| 2005/0178925 A1 | 8/2005 | Broadbent | | |
| 2011/0290946 A1 | 12/2011 | Peirce | | |
| 2013/0334364 A1 | 12/2013 | Parker | | |
| 2017/0327202 A1 * | 11/2017 | Holmes | ..................... | B64C 1/26 |

FOREIGN PATENT DOCUMENTS

| | | |
|---|---|---|
| GB | 2 362 363 | 11/2001 |
| WO | 2006/067403 | 6/2006 |

OTHER PUBLICATIONS

European Search Report cited in EP 18 17 6663 dated Aug. 20, 2018, 10 pages.
Combined Search and Examination Report for GB 1710383.9, dated Dec. 1, 2017, 8 pages.

* cited by examiner

*Primary Examiner* — Rodney A Bonnette
(74) *Attorney, Agent, or Firm* — Nixon & Vanderhye P.C.

(57) ABSTRACT

A leading edge skin panel for an aerodynamic structure of an aircraft. The skin panel includes attachment components for attaching the leading edge skin panel to the structure. A primary attachment component is configured to substantially prevent spanwise relative movement between the leading edge skin panel and the structure. The remaining attachment component are configured to permit a predetermined amount of spanwise relative movement between the leading edge skin panel and the structure.

17 Claims, 6 Drawing Sheets

LEADING EDGE SKIN STRUCTURE

RELATED APPLICATION

This application claims priority to United Kingdom Patent Application GB 1710383.9, filed Jun. 29, 2017, which is incorporated by reference in its entirety.

TECHNICAL FIELD

The present invention relates to a leading edge skin panel for an aerodynamic structure of an aircraft, and an aerodynamic structure having such a leading edge skin panel.

BACKGROUND

In aircraft wing design, it is important to design the wings such that flow over the wings stays laminar for as long as possible. This requires the leading edge (LE) structure of the wing to be designed and manufactured as accurately as possible to provide good wave control over the whole of the LE structure (spanwise waviness of the LE skin should be minimised) and to minimise disturbances in the airflow caused by steps, lumps and bumps (e.g. fasteners) on the LE structure. Furthermore, the LE structure may need to be repaired or replaced during the operational life of the aircraft, to repair minor structural damage incurred during normal operation, and/or to maintain a sufficiently smooth leading edge surface for laminar flow.

A LE structure generally comprises a smooth aerodynamic nose, which forms the foremost edge of a wing (in relation to the oncoming airflow). The LE structure extends rearwardly, with aerodynamic upper and lower surfaces extending outwardly from the nose. The LE structure also generally has a rearmost edge region which attaches to the front of the main wing structure to form the complete wing structure.

Currently, most aircraft wings have a fixed leading edge (FLE) structure, which comprises a skin fastened to leading edge ribs by a regular pitch of rivets or bolts. Such arrangements have various disadvantages. Firstly, the large number of fasteners required to attach the FLE to the wingbox in a manner such that leading edge waviness is minimised makes it difficult to achieve a surface smooth enough to maintain laminar flow. Secondly, removal and replacement of the LE skin is a relatively complex and time consuming operation, so minor damage is repaired in situ where possible. However, it may not be possible to restore an optimally smooth skin surface by in-situ repair; and replacement of the FLE skin will generally be necessary at some point during the operational life of the aircraft.

It should be noted that the some of the same problems apply to other LE structures that are part of an aerodynamic structure of an aircraft, but not part of a wing structure. For example, the concept of achieving laminar flow also applies to other surfaces of an aircraft, such as a tailplane.

The leading edge skin panels described below seek to reduce the time required for removal and replacement of a panel. Moreover, the panels described below can be made fully interchangeable.

SUMMARY

A first aspect of the present invention provides a leading edge skin panel for an aerodynamic structure of an aircraft. The skin panel comprises a plurality of attachment components for attaching the leading edge skin panel to the structure. A primary attachment component is configured to substantially prevent spanwise relative movement between the leading edge skin panel and the structure. The or each remaining attachment component is configured to permit a predetermined amount of spanwise relative movement between the leading edge skin panel and the structure.

Optionally, the attachment components are located at substantially the same distance from a leading edge of the leading edge skin panel, and are spaced apart from each other along a spanwise direction. Optionally, the distance of each attachment component from the leading edge is less than half of the distance of each attachment component from a trailing edge of the leading edge skin panel.

Optionally, the leading edge skin panel comprises an outer aerodynamic upper surface extending in a chordwise and spanwise direction, and an inner surface, in which case the plurality of attachment components may be provided on the inner surface. Optionally, each of the plurality of attachment components is bonded to the inner surface or is formed integrally with the inner surface.

Optionally, the panel and each of the attachment components are metallic, and each of the plurality of attachment components is bonded to the inner surface. Optionally, the panel and each of the attachment components are formed from a composite material, and each of the attachment components is formed integrally with the panel. Optionally, the panel is formed from a composite material, and each of the attachment components is attached to the panel by a hyperjoint.

Optionally, the or each remaining attachment component is configured to substantially prevent relative movement between the leading edge skin panel and the structure in directions orthogonal to the spanwise direction.

A second aspect of the present invention provides an aerodynamic structure for an aircraft. The aerodynamic structure comprises a leading edge skin panel according to the first aspect; and a plurality of chordwise-extending structural components. Each attachment component of the leading edge skin panel is attached to a different corresponding chordwise-extending structural component.

Optionally, each attachment component is configured to transmit a load to the corresponding chordwise-extending structural component.

Optionally, each attachment component comprises a lug and pin arrangement, and each corresponding chordwise-extending structural component comprises a hole configured to receive a pin of the lug and pin arrangement.

Optionally, the primary attachment component comprises a locking mechanism configured to prevent axial movement of the pin relative to the corresponding chordwise-extending structural member.

Optionally, the primary attachment component is further attached to an additional chordwise-extending structural member, and wherein the primary attachment component is configured to permit relative spanwise movement between the primary attachment component and the additional chordwise-extending structural member.

Optionally, the or each remaining attachment component comprises a sliding bearing configured to permit axial movement of the pin relative to the corresponding chordwise-extending structural member. Optionally, the or each remaining attachment component is further attached to a further additional chordwise-extending structural member, and wherein the or each remaining attachment component comprises a further sliding bearing configured to permit axial movement of the pin relative to the further additional chordwise-extending structural member.

Optionally, the or each chordwise-extending structural member is comprised in a leading edge rib of the aerodynamic structure.

Optionally, the aerodynamic structure is an aircraft wing.

A third aspect of the present invention provides an aircraft comprising a leading edge skin panel according to the first aspect or an aerodynamic structure according to the second aspect.

A fourth aspect of the present invention provides an aircraft wing comprising a structural component and a detachable component. The detachable component forms at least part of a leading edge of the wing. The detachable component is attached to the structural component by a primary attachment component and a secondary attachment component, each of which is configured to transmit load from the detachable component to the structural component. The primary attachment component is configured to maintain the relative spanwise positions of the detachable component and the structural component. The secondary attachment component is configured to permit spanwise relative movement of the detachable component and the structural component.

BRIEF DESCRIPTION OF THE DRAWINGS

Embodiments of the invention will now be described, by way of example only, with reference to the accompanying drawings, in which:

FIG. 1b is a plan view of the top surface of the example LE skin panel of FIG. 1a;

FIG. 2b is a perspective view of the example aerodynamic structure of FIG. 2a;

FIG. 5b is a plan view of a top surface of a wing of the example aircraft of FIG. 5a.

DETAILED DESCRIPTION

Figure 1A:
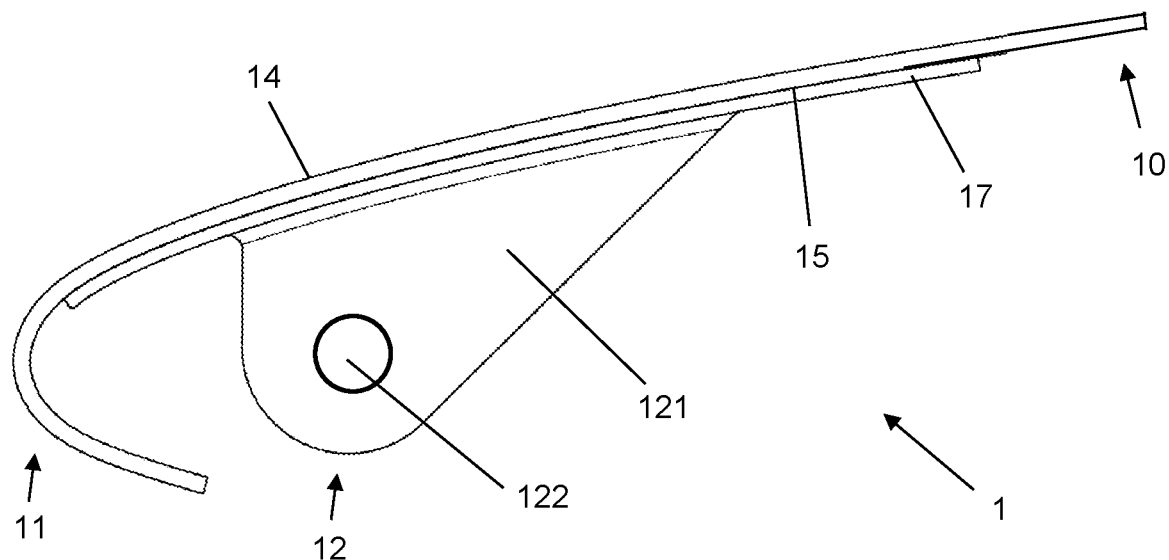
FIG. 1a is a chordwise cross-section through an example LE skin panel according to the invention.

The examples described below relate to aerodynamic structures for aircraft. As used herein, the term "aerodynamic structure" is intended to refer to any structure having a surface which is exposed to airflow during flight, such that the nature of the structure (and in particular the surface) will affect the aerodynamic performance of an aircraft in which the structure is comprised.

LE structures of aircraft aerodynamic structures normally comprise skins supported by a sub-structure. The skins can be structural skins that transmit load from the leading edge into the main wing box. They are usually made of metal (for example, aluminium or titanium alloy or steel) or composite material (for example, Glass Fibre Reinforced Polymer (GFRP) or Carbon Fibre Reinforced Polymer (CFRP)). Structural skins are traditionally monolithic in nature, each skin being formed from a single piece of material. Alternatively, the skin may be provided in the form of a panel. LE skin panels do not generally carry the main wing loads and, instead, simply maintain the aerodynamic shape. Again, these panels can be made from metals or composite materials. The panels can be monolithic but, more usually, are made as sandwich panels with a layer of core material (such as honeycomb or closed cell foam) in between two face sheets.

Known LE sub-structures comprise chordwise-extending structural members in the form of ribs. Most ribs are constructed from aluminium alloy and can be machined from a billet or assembled in parts. Some ribs have been made with composite materials, generally when neighbouring components are also made of composite materials. The ribs are typically bolted to the wing box, and transmit loads experienced by the LE structure to the wing box. Unless the skin is structural, the ribs transmit substantially all of the loads experienced by the LE structure. The various components of LE structures are normally mechanically fastened together (for example, using rivets) but can also be bonded, or even thermoplastically welded, together. Typically, the trailing edges of the LE structure skins are attached to cover panels and/or spars of the wing box structure using fasteners such as rivets or bolts, as mentioned above. The fasteners create bumps on the LE skin surface, which has a negative effect on laminar flow. However; a large number of relatively closely-spaced fasteners must be used in order to minimise spanwise waviness of the leading edge.

The examples described below seek to provide a LE structure which promotes laminar flow, and which also permits relatively quick and simple replacement of a LE skin panel. Each example described below comprises a LE skin panel for an aerodynamic structure of an aircraft, the panel comprising a plurality of attachment components for attaching the LE skin panel to the structure. In each example a primary attachment component is configured to substantially prevent relative movement between the LE skin panel and the structure, and the or each remaining attachment component is configured to permit a predetermined amount of spanwise relative movement between the LE skin panel and the structure.

Figure 1B:
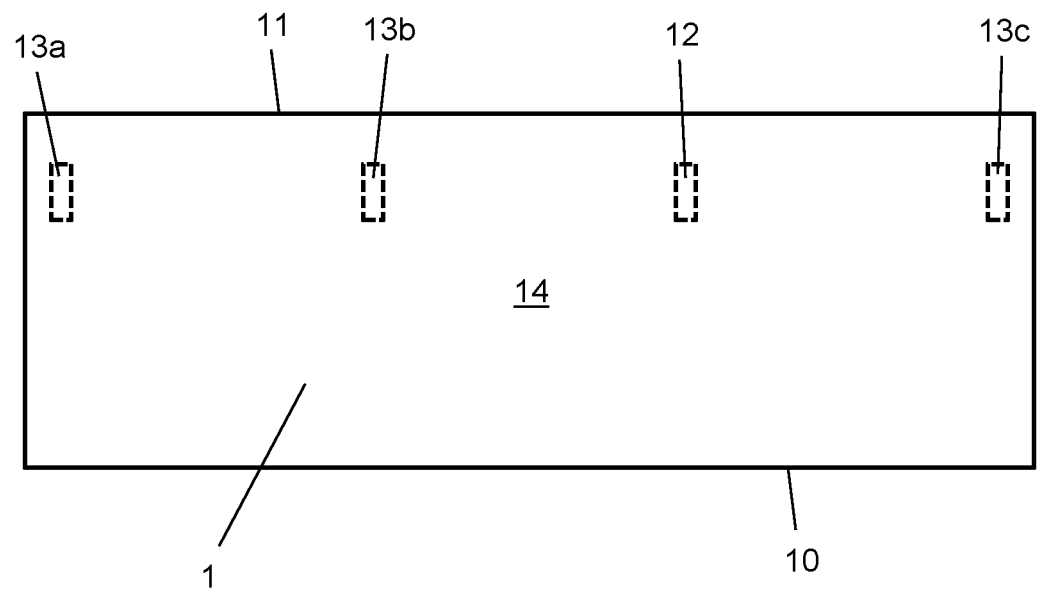

FIGS. 1a and 1b show an example LE skin panel 1. FIG. 1a shows a chordwise cross section through the panel 1, and FIG. 1b shows a plan view of the top surface of the panel 1. The skin panel 1 has an outer aerodynamic upper surface 14 which extends in a chordwise and spanwise direction, and an inner surface 15. A plurality of attachment components 12, 13a-c are provided on the inner surface 15 (only one attachment component is visible in FIG. 1a). The attachment components 12, 13a-c are for attaching the skin panel 1 to an aerodynamic structure of an aircraft (not shown). One of the attachment components is a primary attachment component 12, which is configured to substantially prevent spanwise relative movement (and to limit or substantially prevent relative movement in all other directions) between the skin panel 1 and an aerodynamic structure to which the skin panel 1 is attached.

The remaining attachment components 13a-c are configured to permit a predetermined amount of spanwise relative movement between the skin panel 1 and an aerodynamic structure 1 to which the skin panel is attached. The remaining attachment components 13a-c may limit or substantially prevent relative movement between the skin panel 1 and the aerodynamic structure 1 in directions other than (e.g. directions orthogonal to) the spanwise direction. The remaining attachment components 13a-c may be considered to be secondary attachment components. A leading edge skin panel according to the invention will always have only one primary attachment component. However; the number of secondary attachment components may vary. There will always be at least one secondary attachment component, in addition to the primary attachment component. The number of secondary attachment components may depend, for example, on the spanwise length of the skin panel.

The skin panel 1 has a leading edge 11 and a trailing edge 10. The panel 1 curves downwardly at the leading edge, to form an aerodynamic leading edge surface of an aerodynamic structure to which the skin panel 1 is attached. The trailing edge is configured to be attached, in any suitable manner, to a structural part (e.g. a wing box) of an aerodynamic structure to which the skin panel 1 is attached. Attachment of the trailing edge of the skin panel 1 to the aerodynamic structure is outside the scope of the present invention and therefore features of the trailing edge will not be further discussed. The skin panel 1 may be metallic (e.g. aluminium), or may comprise a composite material such as CFRP.

The attachment components 12, 13a-c are located at substantially the same distance from the leading edge 11 of the skin panel 1, and are spaced apart from each other along a spanwise direction. The distance of each attachment component 12, 13a-c from the leading edge 11 is less than half of the distance of each attachment component from the trailing edge 10. That is, the attachment components 12, 13a-c are located relatively near the leading edge 11 of the LE skin panel 1. In FIGS. 1a and 1b the skin panel 1 is not shown in proportion, for ease of depiction. Typically, the chordwise dimension of the panel will be greater in comparison to the other dimensions than is shown in FIGS. 1a and 1b.

In the illustrated example the spanwise distance between each pair of adjacent attachment components is equal, but this need not be the case for all examples. The spanwise spacing of the attachment components 12, 13a-c may be selected to minimise spanwise waviness of the leading edge skin during flight, or to cause any waviness which occurs during flight to have certain predefined or desired properties (e.g. a certain wavelength and/or amplitude). The predefined or desired properties may, for example, be advantageous for promoting or maintaining laminar flow over the leading edge.

Each attachment component 12, 13a-c comprises a lug and pin arrangement having a lug 121 and a pin 122. In the illustrated example, each lug 121 is integrally formed with a mounting plate 17, which is shaped to conform to the inner surface 15 of the panel. The mounting plate 17 provides a large contact area between the lug 121 and the inner surface 15, to facilitate fixing of the lug 16 to the panel 1. The composition of the lugs 121 and the manner in which they are fixed to the panel depends on the composition of the panel 1. In examples in which the panel is metallic, the lugs 121 may also be metallic and may be fixed to the panel by metal-to-metal bonding. In examples in which the panel comprises a prepreg carbon fibre composite material, the lugs 121 may be formed from a composite material or may be metallic (e.g. titanium) and may be fixed to the panel 1 by hyperjoints. In examples in which the panel comprises a resin infused carbon fibre composite material, the lugs 121 may be formed integrally with the panel 1 (or at least the inner surface thereof)—that is they comprise the same composite material, and are manufactured together with the panel, e.g. using an additive manufacturing process. Hyperjoints may also be used to fix composite or metallic lugs to a resin infused carbon fibre panel.

Figure 2A:
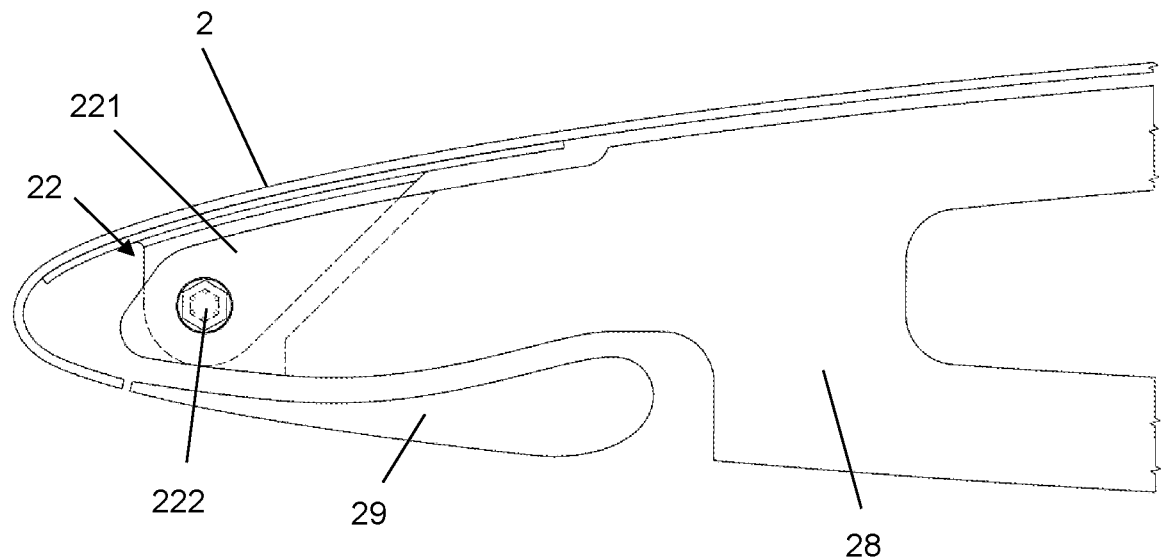
FIG. 2a is a chordwise cross-section through part of an example aerodynamic structure according to the invention.
Figure 2B:
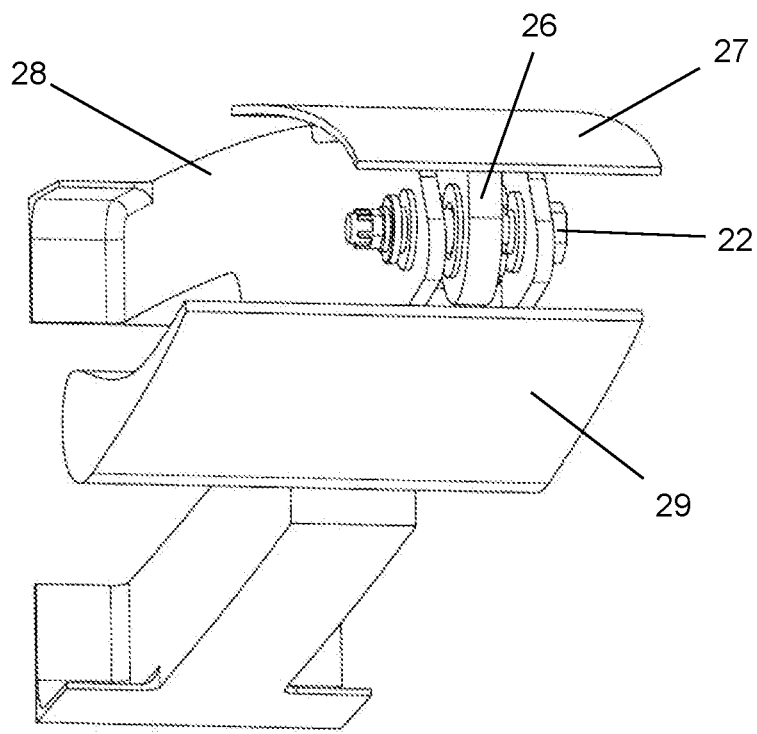

FIGS. 2a and 2b show an example LE skin panel 2 attached to an example aircraft aerodynamic structure (the only parts of the aerodynamic structure visible in FIGS. 2a and 2b are a chordwise-extending structural component in the form of a leading edge rib 28 and a Krueger 29). The skin part of the skin panel 2 is omitted from FIG. 2b so that the rib 28 and an attachment component of the panel 2 can clearly be seen. The skin panel 2 may have any of the same features as the example skin panel 1 described above. The skin panel 2 comprises an attachment component 22 in the form of a lug 221 and pin 222 arrangement, which may have any of the same features as the lug 121 and pin 122 arrangement described above in relation to FIGS. 1a and 1b. The rib 28 and Krueger 29 may be of any suitable known design and are unmodified by the present invention, except for the provision of a mounting feature on the rib 28 which is configured to cooperate with an attachment component 22 of the skin panel 2. The aerodynamic structure comprises multiple leading edge ribs, spaced along a spanwise axis of the aerodynamic structure. Each rib may have substantially the same features as the rib 28 shown in FIGS. 2a and 2b.

Each attachment component of the skin panel 2 (that is, the primary attachment component 22 and each remaining (secondary) attachment component) is attached to a different corresponding rib. The aerodynamic structure may comprise more ribs in a given spanwise length than there are attachment components in that same length, in which case only some of the ribs will correspond to an attachment component. The term "corresponding rib" (or "corresponding chordwise-extending structural component") is intended to refer only to ribs/components which have a corresponding attachment component (that is, ribs to which the skin panel 2 is connected when attached to the aerodynamic structure). A mounting feature is provided on each corresponding rib 28, and each attachment component 22 of the skin panel 2 is configured to attach to the corresponding mounting feature. In the illustrated example, each mounting feature comprises one or more holes or bores extending in the spanwise direction through the rib, for receiving the pin 222 of the attachment component 22. A given rib may comprise more than one chordwise-extending structural component as will become apparent from the following discussion. For example, it can be seen from FIG. 2b that the leading edge end of the rib 28 comprises two chordwise-extending members, between which the lug 26 is received (that is, the two chord-wise extending members form a clevis). Each of these chordwise-extending members may individually be considered to be a chordwise-extending structural component.

Each attachment component of the skin panel 2 is configured to transmit a load to the corresponding rib. The loads transmitted include most or substantially all of the weight of the skin panel 2, as well as most or substantially all of the aerodynamic forces experienced by the skin panel 2 during operation of the aerodynamic structure.

Figure 3:
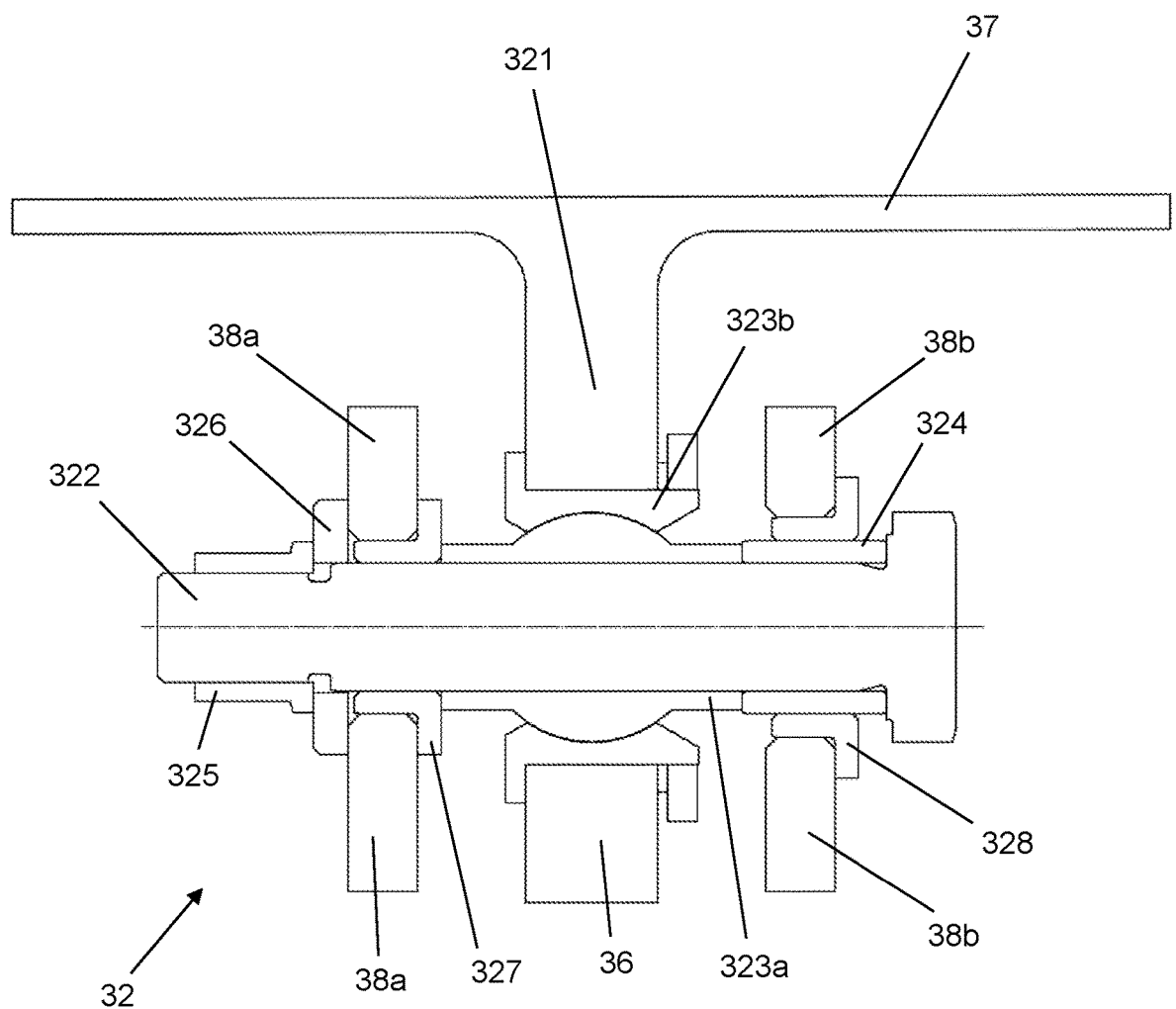
FIG. 3 is a spanwise cross-section through an example primary attachment component and corresponding mounting feature for the example aerodynamic structure of FIGS. 2a and 2b.

FIG. 3 shows a spanwise cross-section through a particular example primary attachment component 32 and corresponding rib clevis 38a, 38b, in an attached configuration. The primary attachment component 32 is suitable for use as the primary attachment component 12 or the primary attachment component 22, and may have any of the features of the primary attachment components 12 and 22 described above.

The primary attachment component 32 comprises a lug 321, which is integrally formed with a mounting plate 37, and a pin 322. The pin 322 has a head and a shaft. A spanwise extending hole (bore) is formed in the lug 321, to receive the shaft of the pin 322. In the illustrated example a spherical bearing comprising an outer ring 323b which is fixed inside the hole and an inner ring 323a which receives the shaft of the pin 322. A certain amount of pivoting (about the centre of the spherical bearing) of the lug 321 relative to the rib is thereby permitted when the attachment component 32 is attached to the rib clevis 38a, 38b. This may advantageously accommodate deformations (e.g. bending, twisting or the like) of the aerodynamic structure which are typically experienced during normal operation. However; the spherical bearing is not essential to the functioning of the invention and other examples are envisaged in which a different type of bearing, or no bearing at all, is provided between the inner surface of the hole and the shaft of the pin 322.

In the illustrated example, the rib comprises a clevis formed by a pair of chordwise-extending members (clevis members) 38a, 38b, spaced apart by a distance sufficient that the lug 321 can be received between the two clevis members 38a, 38b. A spanwise extending hole (bore) is comprised in each clevis member 38a, 38b. These holes are coaxial with the hole in the lug 321 in the attached configuration. In the attached configuration, the shaft of the pin 322 passes through the inner ring 323a of the spherical bearing and through the holes in the clevis members 38a, 38b. The diameter of the hole in the right-hand (with respect to FIG. 3) chordwise-extending member 38b is larger than the diameter of the left-hand chordwise-extending member 38a, so that it may accommodate both a flanged bush 328 and a plain bush 324 (which functions as a sliding bearing) between the inner surface of the hole and the pin shaft. The hole in the left-hand chordwise-extending member 38a, by contrast, only accommodates a flanged bush 327 between the inner surface of the hole and the pin shaft.

The plain bush 324 is configured to facilitate axial movement between the pin 322 and the right-hand clevis member 38b, to accommodate thermal expansion of the pin 322, the rib 38a, 38b and/or other deformations of the attachment component 32 and/or the aerodynamic structure which may typically be experienced during operation of the aerodynamic structure. By contrast, the left-hand clevis member is held in a fixed axial position relative to the pin 322, by virtue of being clamped between a washer 326 and the flange of the flanged bush 327. The clamping force is exerted by a locking nut 325, and reacted by the head of the pin 322 via the inner ring 323a of the spherical bearing and the plain bearing 324. The primary attachment component 32 thereby substantially prevents relative spanwise movement between the leading edge skin panel and the left-hand clevis member 38a of the rib 38.

The combination of the locking nut 325, washer 326, flanged bearing 327, inner ring 323a and plain bush 324 may be considered to be a locking mechanism configured to prevent axial movement of the pin 322 relative to the left-hand clevis member. The key elements of the locking mechanism are first and second radially-protruding members (provided by the washer 326 and the flanged bearing 327), each of which extends from a different fixed axial location on the pin 322, and a retaining mechanism configured to maintain the radially-protruding members in the fixed axial locations (provided by the combination of the locking nut 325, inner ring 323a, plain bush 324 and the head of the pin 322). The left-hand clevis member 38a is between the first and second radially-protruding members and the distance between the different fixed axial locations is substantially equal to an axial thickness of the left-hand clevis member 38a, such that axial movement of the left-hand clevis member 38a relative to the pin 322 is substantially prevented.

Figure 4:
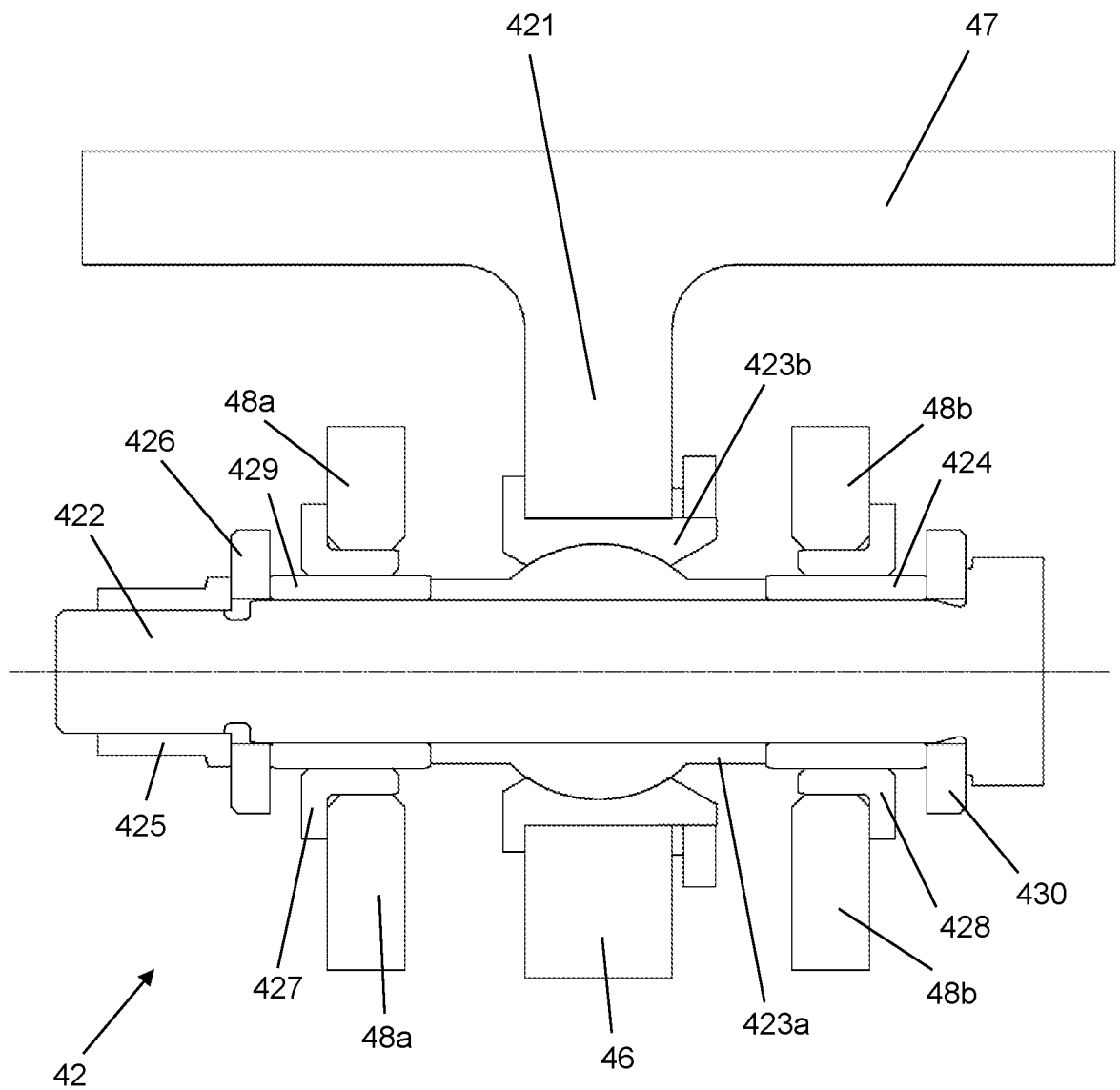
FIG. 4 is a spanwise cross-section through an example remaining attachment component and corresponding mounting feature for the example aerodynamic structure of FIGS. 2a and 2b.

FIG. 4 shows a spanwise cross-section through a particular example remaining (secondary) attachment component 42 and corresponding rib 48a, 48b, in an attached configuration. The secondary attachment component 32 is suitable for use as any or all of the remaining attachment components 13a-c, and may have any of the features of the remaining attachment components 13a-c described above.

The secondary attachment component 42 comprises a lug 421, which is integrally formed with a mounting plate 47, and a pin 422. The lug 421 and the pin 422 are substantially similar to the lug 321 and the pin 322 of the primary attachment component 32 described above. As with the primary attachment component 32, the particular illustrated secondary attachment component 42 comprises a spherical bearing comprising an outer ring 423b which is fixed inside the hole of the lug 421 and an inner ring 423a which receives the shaft of the pin 322. The same functionality and advantages of the spherical bearing 323a, 323b are provided by the spherical bearing 423a, 423b. However; it is not essential for a secondary attachment component according to the invention to comprise a spherical bearing and other examples are envisaged in which a different type of bearing, or no bearing at all, is provided between the inner surface of the hole and the shaft of the pin 422.

In the illustrated example, the rib comprises a pair of chordwise-extending clevis members 48a, 48b, which are substantially similar in structure and arrangement to the chordwise-extending clevis members 38a, 38b described above. However; unlike in the primary attachment component 32, in the secondary attachment component 42 the diameter of the hole in the right-hand (with respect to FIG. 4) clevis member 48b is substantially the same as the diameter of the left-hand clevis member 48a. This is because both holes accommodate both a flanged bush 427, 428 and a plain bush 424, 429 between the inner surface of the hole and the pin shaft. Each flanged bush 427, 428 is fixedly attached to its corresponding clevis member 48a, 48b. Each plain bush 424, 429 is held in a fixed axial location on the shaft of the pin 422 and functions as a sliding bearing.

The plain bush 429 is configured to facilitate axial movement between the pin 422 and the left-hand clevis member 48a, and the plain bush 424 is configured to facilitate axial movement between the pin 422 and the right-hand clevis member 48b. More particularly, each plain bush 424, 429 is configured to slide axially relative to the corresponding flanged bush 427, 428 that it is received within. Axial movement of the pin 422 to the left relative to the clevis members 48a, 48b, is limited by a left-hand radially-extending member (in the form of a first washer 426) and axial movement of the pin 422 to the right relative to the clevis members 48a, 48b is limited by a right-hand radially-extending member (in the form of a second washer 430). Each of the first and second washers 426, 430 is held at a different fixed axial location on the pin 322 by a locking nut 425, which is fixed in a position such that an axial distance between the locking nut 425 and the head of the pin 422 is substantially equal to the total axial lengths of the first and second washers 426, 430, the two plain bushes 429, 424, and the inner ring 423a of the spherical bearing. The axial distance between the locking nut 425 and the head of the pin 422 is greater (by a predetermined amount) than the axial distance between the left-hand edge of the left-hand flanged bearing 427 and the right-hand edge of the right-hand flanged bearing 428. This difference in distance will hereinafter be referred to as a "permitted spanwise floatation". A predetermined amount of relative axial movement (corresponding to the permitted spanwise floatation) between the pin 322 and the rib 48a, 48b is thereby enabled. Consequently, a predetermined amount of relative spanwise movement between a leading edge skin panel in which the secondary attachment component 42 is comprised, and an aerodynamic structure in which the rib 48a, 48b is comprised, is permitted by the secondary attachment component 42. The value of the permitted spanwise floatation may be selected based on the particular properties of the leading edge panel and/or the aerodynamic structure to which it is to be attached.

Various advantages result from attaching a LE skin panel to an aerodynamic structure using attachment components where only one of the attachment components fixes the relative spanwise positions of the skin panel and the aerodynamic structure. Aerodynamic structures typically experience significant deformation during operation. For example, an aircraft wing may bend in one direction when the aircraft is on the ground, and in the opposite direction when the aircraft is in flight. Additionally, other types of deformation such as twisting may occur during flight. To minimise structural stress during build of a conventional wing structure, the wing box must be held (by jacks) to simulate the jig shape during attachment of the leading edge structures. This requirement for jacking makes the process of fitting or replacing a conventional leading edge structure complex and time-consuming.

By contrast, example leading edge panels according to the present invention can be attached to a wingbox even when that wingbox is in a bent condition (e.g. the normal position adopted by a wing when the aircraft is on the ground). No jacking is therefore required in order to fit or replace a leading edge panel according to the present invention, which considerably simplifies and accelerates the fitting/replacement of such leading edge panels. This is possible because the secondary attachment components can accommodate variances in the spanwise position of their corresponding chordwise-extending structural components resulting from bending or other deformation of the wingbox. To achieve this advantage, the permitted spanwise floatation amount should be large enough to accommodate the maximum deformation expected to be experienced by a given aerodynamic structure during operation. In some examples, the permitted spanwise floatation amount of a given secondary attachment component is at least as great as a change in axial position experienced by a chordwise-extending structural component to which that secondary attachment component is to be attached, between a ground configuration of an aerodynamic structure in which the chordwise-extending structural component is comprised, and a cruising flight configuration of that aerodynamic structure.

Figure 5A:
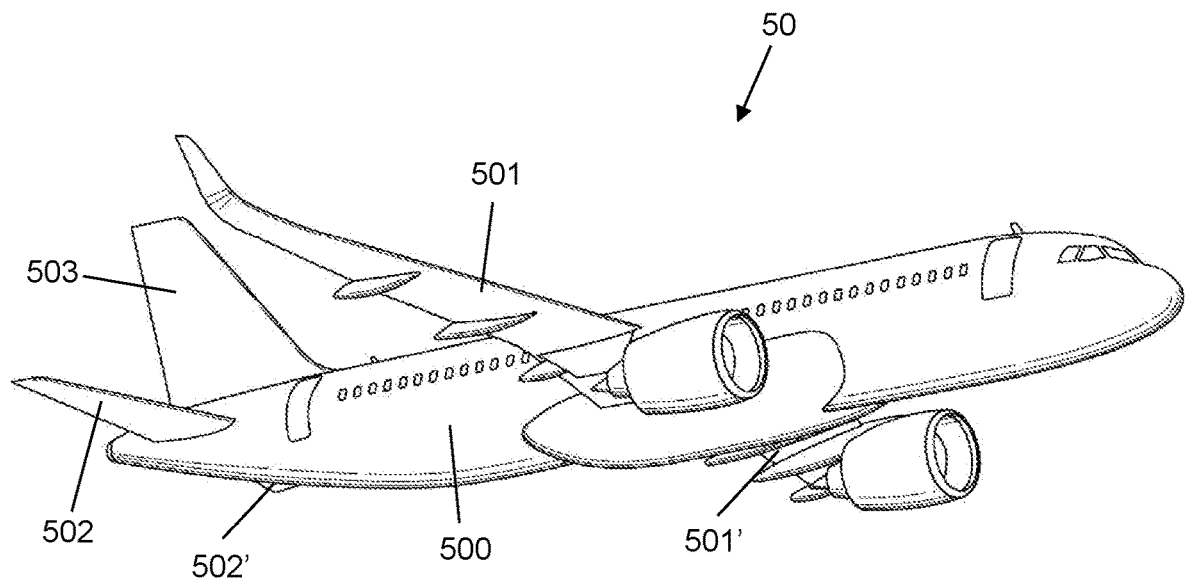
FIG. 5a is a perspective view of an example aircraft comprising an aerodynamic structure according to the invention.
Figure 5B:
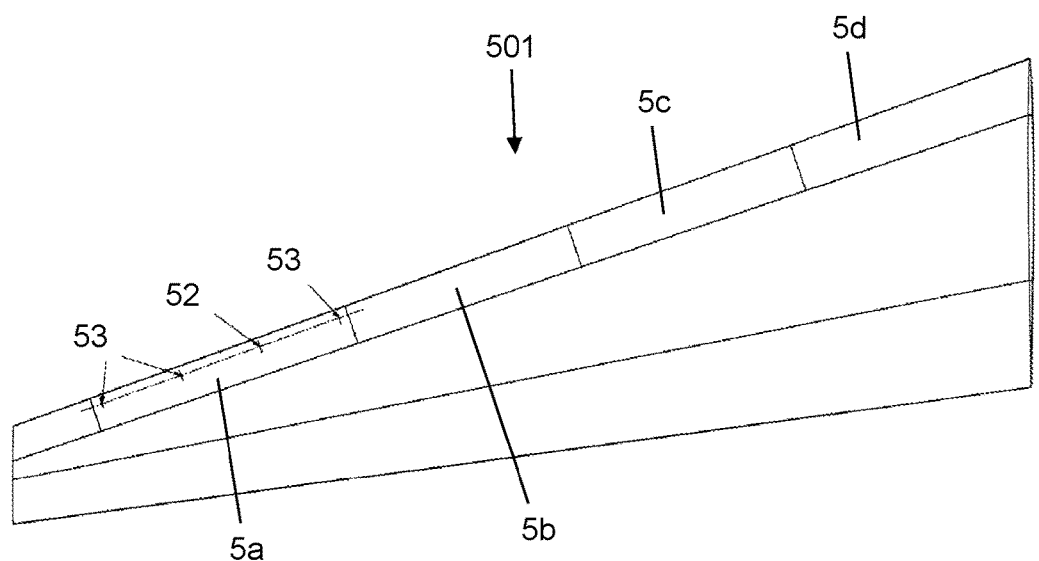

FIG. 5a shows an example aircraft 50 comprising an aerodynamic structure according to the invention. In particular the aircraft 50 comprises an aerodynamic structure in the form of an aircraft wing 501. A plan view of the top surface of the wing 501 is shown in FIG. 5b. The wing 501 comprises a plurality of leading edge skin panels 5a-d, each of which is a leading edge skin panel according to the invention, and may have any or all of the features of the example skin panels 1 and 2 described above. The plurality of skin panels 5a-d forms the leading edge of the wing 501. The skin panel 5a is attached to the wing 501 by a primary attachment component (at the location 52) and three secondary attachment components (at the locations 53). The other skin panels 5b-d are similarly attached to the wing 501. The aircraft 50 comprises a further aerodynamic structure according to the invention, in the form of a second wing 501'. The second wing 501' may have corresponding features to the first wing 501. The aircraft 500 comprises further aerodynamic structures in the form of a vertical stabiliser 503, and a pair of tailplanes 502, 502'. Any or all of these further aerodynamic structures may be aerodynamic structures according to the invention.

Figure 6:
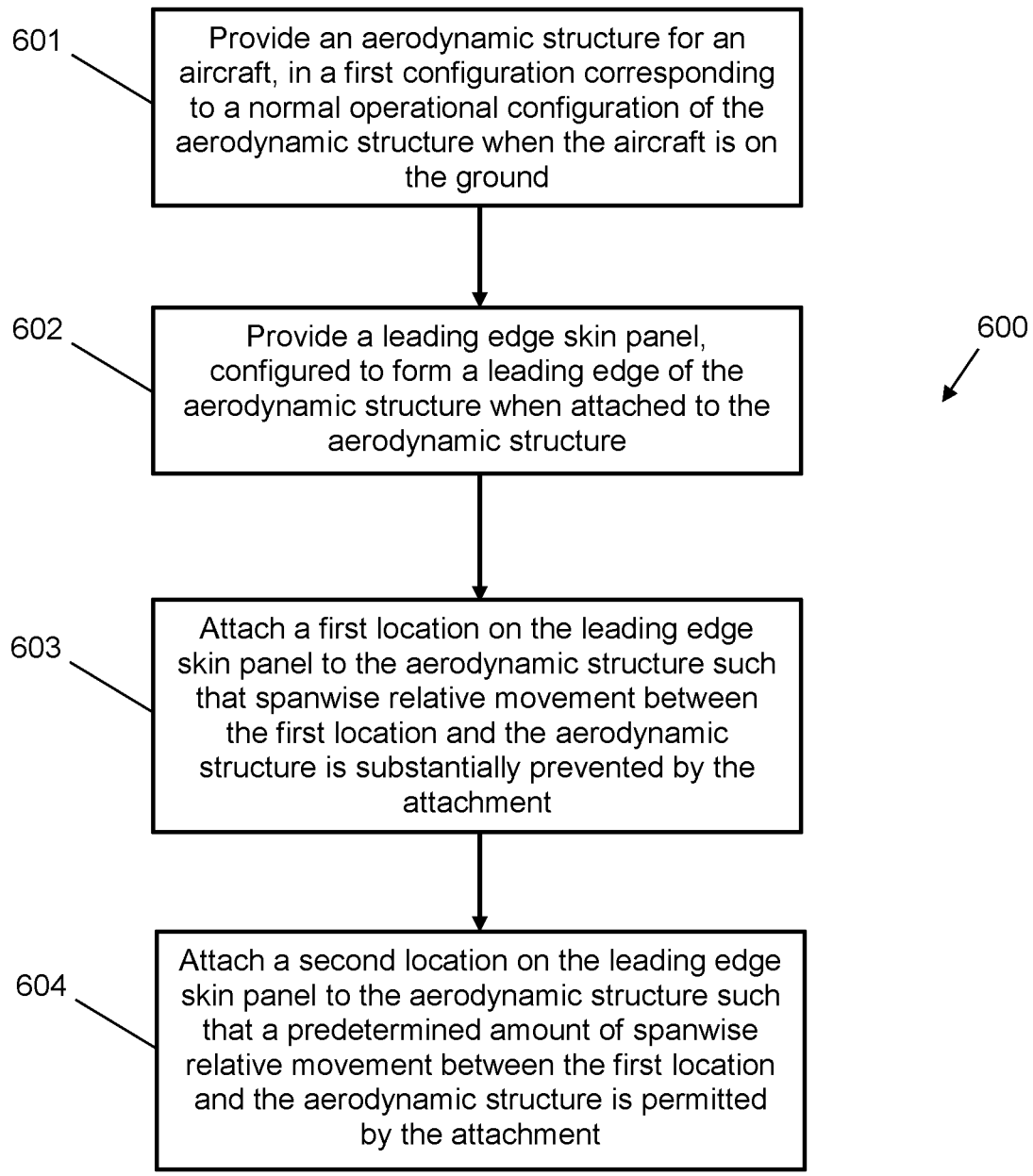
FIG. 6 is a flow chart implementing an example method of attaching a LE skin panel according to the invention to an aerodynamic structure.

An example method 600 of attaching a LE skin panel according to the invention to an aerodynamic structure for an aircraft will now be described with reference to FIG. 6. The LE skin panel may be any of the example panels described above. The aerodynamic structure may be any of the example aerodynamic structures described above. The example method 600 may be used in fitting a leading edge structure during manufacture of a new aircraft, or it may be used in replacing a leading edge structure of an existing aircraft part-way through the operational life of that aircraft.

In a first block 601, an aerodynamic structure for an aircraft is provided, which may be any of the example aerodynamic structures described above. The aerodynamic structure is provided in a first configuration corresponding to a normal operational configuration of the aerodynamic structure when the aircraft is on the ground. The first configuration may be deformed with respect to a second configuration corresponding to a normal operational configuration of the aerodynamic structure when the aircraft is in flight. The aerodynamic structure may be bent along a spanwise direction by a greater degree, and or in a different direction, when in the first configuration as compared to when in the second configuration. The aerodynamic structure may remain in the first configuration during all steps of the method 600. The aerodynamic structure may be provided in an incomplete condition. In particular, the aerodynamic structure may be missing a leading edge panel. The aerodynamic structure may be a new aerodynamic structure (that is, an aerodynamic structure which has not yet experienced operational service) or it may be a used aerodynamic structure (that is, an aerodynamic structure which has experienced operational service, and in particular has flown as part of an aircraft).

In block 602, a leading edge skin panel is provided. The LE skin panel is configured to form at least part of a leading edge of the aerodynamic structure when it is attached to the aerodynamic structure. The LE skin panel may be any of the example LE skin panels described above. The LE skin panel may be a new skin panel (that is, a panel which has not previously been attached to an aerodynamic structure) or it may be a used skin panel (that is, a panel which has previously been attached to an aerodynamic structure). If used, the LE skin panel may be a repaired, refurbished or upgraded LE skin panel, which has undergone repair or modification work.

In block 603, a first location on the LE skin panel is attached to the aerodynamic structure. The first location may correspond to the location of a primary attachment component of the LE skin panel. The first location may be attached to a chordwise-extending structural component of the aerodynamic structure, in any of the manners described above in relation to the example primary attachment components. The first location is attached to the aerodynamic structure such that spanwise relative movement between the first location and the aerodynamic structure is substantially prevented by the attachment. The aerodynamic structure is in the first configuration during the performance of block 603.

In block 604, a second location on the LE skin panel is attached to the aerodynamic structure. The second location may correspond to the location of a secondary (remaining) attachment component of the LE skin panel. The second location may be attached to a chordwise-extending structural component of the aerodynamic structure, in any of the manners described above in relation to the example secondary attachment components. The second location is attached to the aerodynamic structure such that a predetermined amount of spanwise relative movement between the first location and the aerodynamic structure is permitted by the attachment. The aerodynamic structure is in the first configuration during the performance of block 604. In examples in which the LE skin panel comprises multiple secondary attachment components, each provided at a different second location on the LE skin panel, block 604 is performed in respect of each of the multiple second locations.

A method of fitting/replacing an example LE skin panel according to the present invention (such as the above-described method 600) may be sufficiently quick and simple to perform that it becomes practicable to replace a LE skin panel which has incurred only minor damage, instead of repairing the panel in-situ. Furthermore, upgrading LE skin panels with improved versions, one or more times during the operational life of an aircraft, may be made practicable by the present invention. A damaged LE panel which has been removed from an aircraft may be repaired ex-situ, more easily than is possible in-situ, and then refitted to the same or a different aircraft at a later time. A leading edge skin panel according to the invention may therefore be considered to be a detachable component.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A leading edge skin panel for an aerodynamic structure of an aircraft comprising
a plurality of attachment components for attaching the leading edge skin panel to the aerodynamic structure,
wherein the attachment components are each located a uniform distance from a leading edge of the leading edge skin panel, and are spaced apart from each other along a spanwise direction,
wherein a primary attachment component of the plurality of attachment components is configured to suppress spanwise relative movement between the leading edge skin panel and the aerodynamic structure, and
the or each remaining attachment component of the plurality of attachment components is configured to permit a predetermined amount of spanwise relative movement between the leading edge skin panel and the aerodynamic structure.

2. The leading edge skin panel according to claim 1, wherein the uniform distance from the leading edge is less than half of a distance between each attachment component and a trailing edge of the leading edge skin panel.

3. The leading edge skin panel according to claim 1, comprising an outer aerodynamic upper surface extending in a chordwise and spanwise direction, and an inner surface; wherein the plurality of attachment components are provided on the inner surface.

4. The leading edge skin panel according to claim 3, wherein each of the plurality of attachment components is bonded to the inner surface or is formed integrally with the inner surface.

5. The leading edge skin panel according to claim 4, wherein the leading edge skin panel and each of the plurality of attachment components are metallic, and wherein each of the plurality of attachment components is bonded to the inner surface.

6. The leading edge skin panel according to claim 1, wherein the leading edge skin panel and each of the plurality of attachment components are formed from a composite material, and wherein each of the plurality attachment components is formed integrally with the panel.

7. The leading edge skin panel according to claim 1, wherein the leading edge skin panel is formed from a composite material, and wherein each of the plurality of attachment components is attached to the leading edge skin panel by a hyperjoint.

8. The leading edge skin panel according to claim 1, wherein the or each remaining attachment component is configured to suppress relative movement between the leading edge skin panel and the aerodynamic structure in directions orthogonal to the spanwise direction.

9. An aerodynamic structure for an aircraft comprising:
a leading edge skin panel according to claim 1; and
a plurality of chordwise-extending structural components;
wherein each of the plurality of attachment components of the leading edge skin panel is attached to a different one of the plurality of chordwise-extending structural components.

10. The aerodynamic structure according to claim 9, wherein each of the plurality of attachment components is configured to transmit a load to a corresponding one of the plurality of chordwise-extending structural components.

11. The aerodynamic structure according to claim 9, wherein each of the plurality of attachment components includes a lug and pin arrangement, and each of the plurality of chordwise-extending structural components includes a hole configured to receive a pin of the lug and pin arrangement of a corresponding one of the plurality of attachment components.

12. The aerodynamic structure according to claim 11, wherein a primary attachment component of the plurality of attachment components comprises a locking mechanism configured to prevent axial movement of the pin relative to the one of the plurality of chordwise-extending structural members receiving the pin.

13. The aerodynamic structure according to claim 9, wherein the primary attachment component is further attached to an additional chordwise-extending structural member, and wherein the primary attachment component is configured to permit relative spanwise movement between the primary attachment component and the additional chordwise-extending structural member.

14. The aerodynamic structure according to claim 9, wherein the or each remaining attachment component comprises a sliding bearing configured to permit axial movement of the pin relative to the corresponding chordwise-extending structural member.

15. The aerodynamic structure according to claim 14, wherein the or each remaining attachment component is further attached to a further additional chordwise-extending structural member, and wherein the or each remaining attachment component comprises a further sliding bearing configured to permit axial movement of the pin relative to the further additional chordwise-extending structural member.

16. The aerodynamic structure according to claim 9, wherein the or each chordwise-extending structural member is comprised in a leading edge rib of the aerodynamic structure.

17. The aerodynamic structure according to claim 9, wherein the aerodynamic structure is an aircraft wing.

* * * * *